Oct. 18, 1938.  H. L. BLUM  2,133,270
COMPOUND ACTION METER
Filed Oct. 12, 1935   4 Sheets-Sheet 1
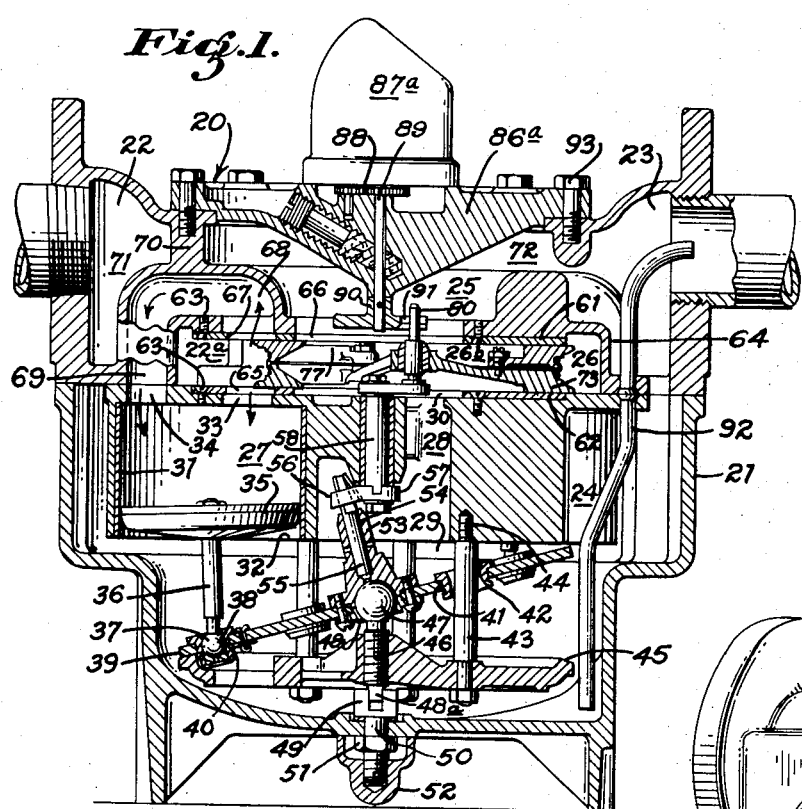
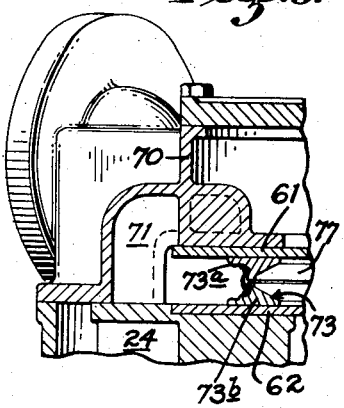
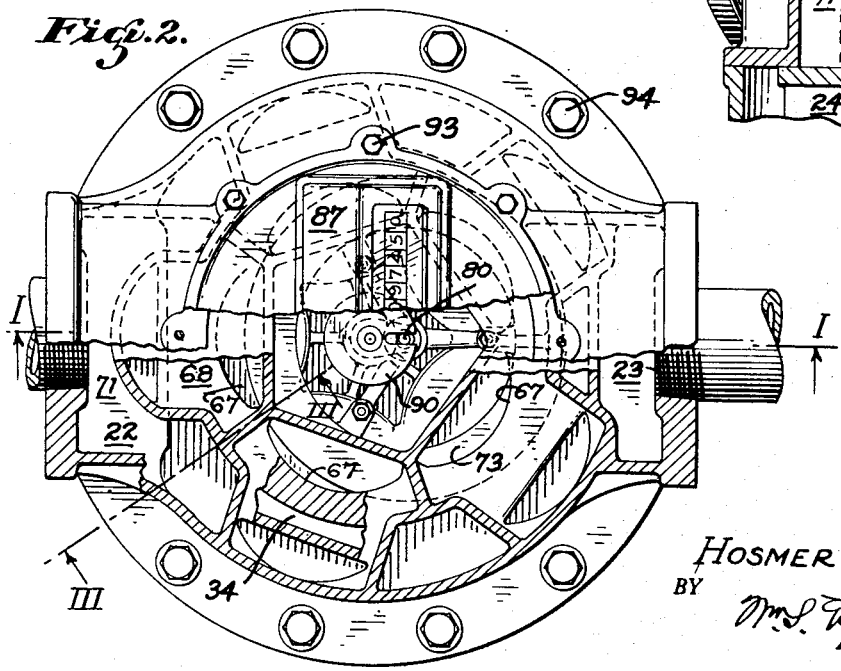
INVENTOR.
HOSMER L. BLUM.
BY
ATTORNEY

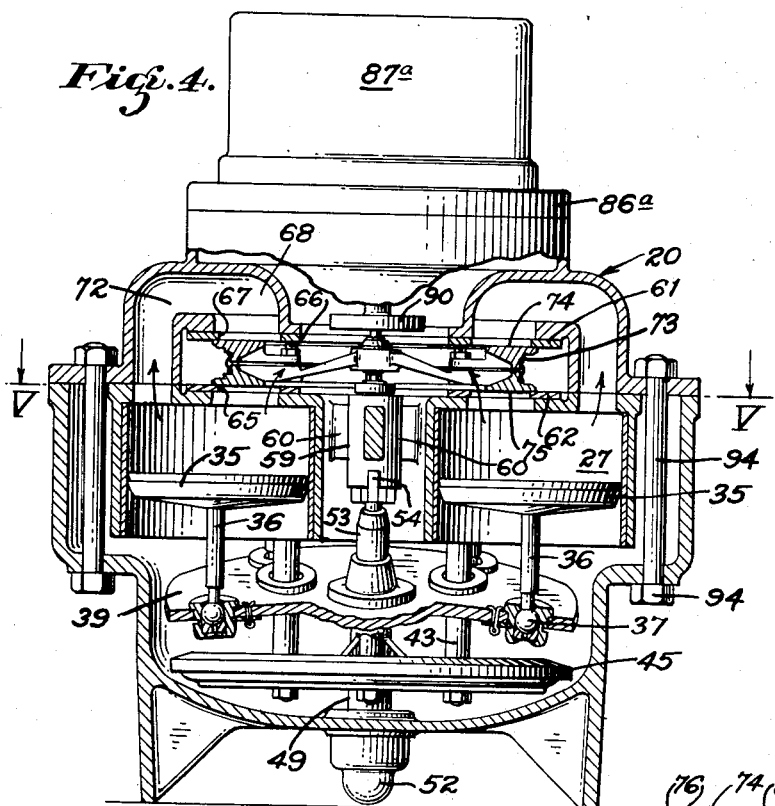
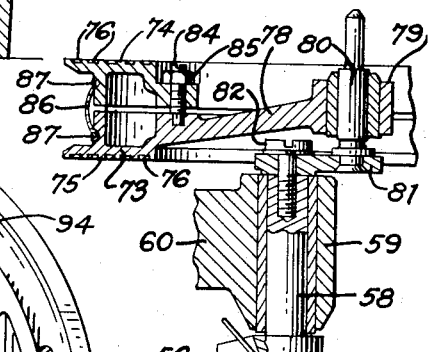
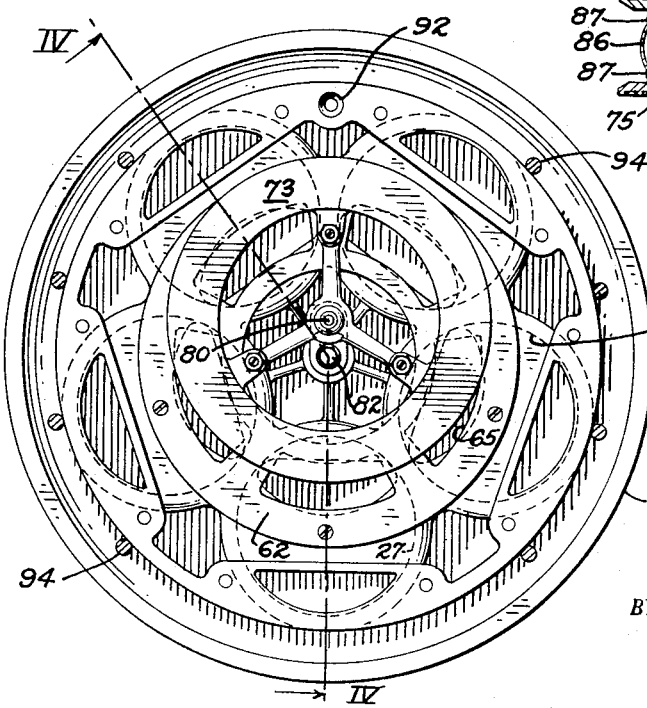

Oct. 18, 1938.  H. L. BLUM  2,133,270
COMPOUND ACTION METER
Filed Oct. 12, 1935  4 Sheets-Sheet 3
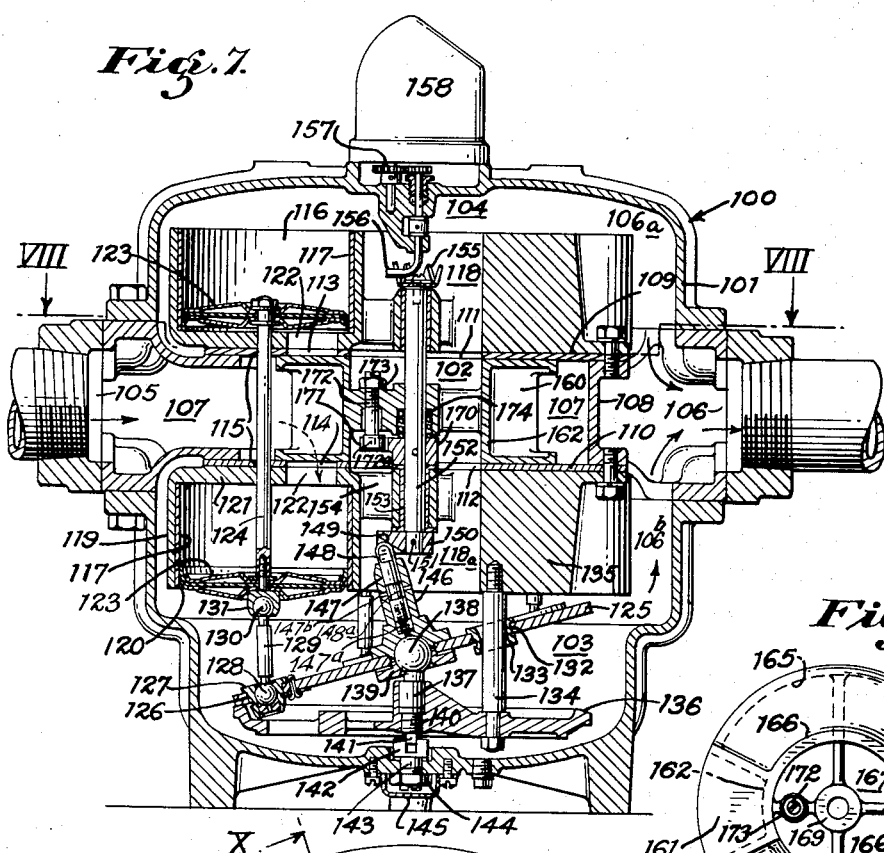
Fig. 7.
Fig. 9.
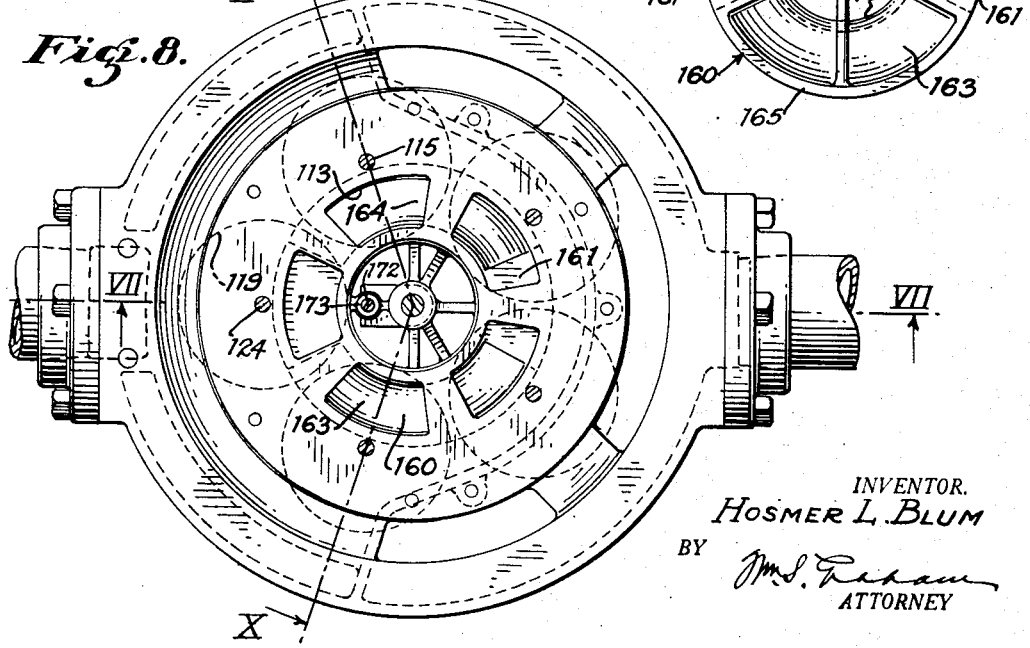
Fig. 8.
INVENTOR.
HOSMER L. BLUM
BY
ATTORNEY Oct. 18, 1938.   H. L. BLUM   2,133,270
COMPOUND ACTION METER
Filed Oct. 12, 1935   4 Sheets-Sheet 4
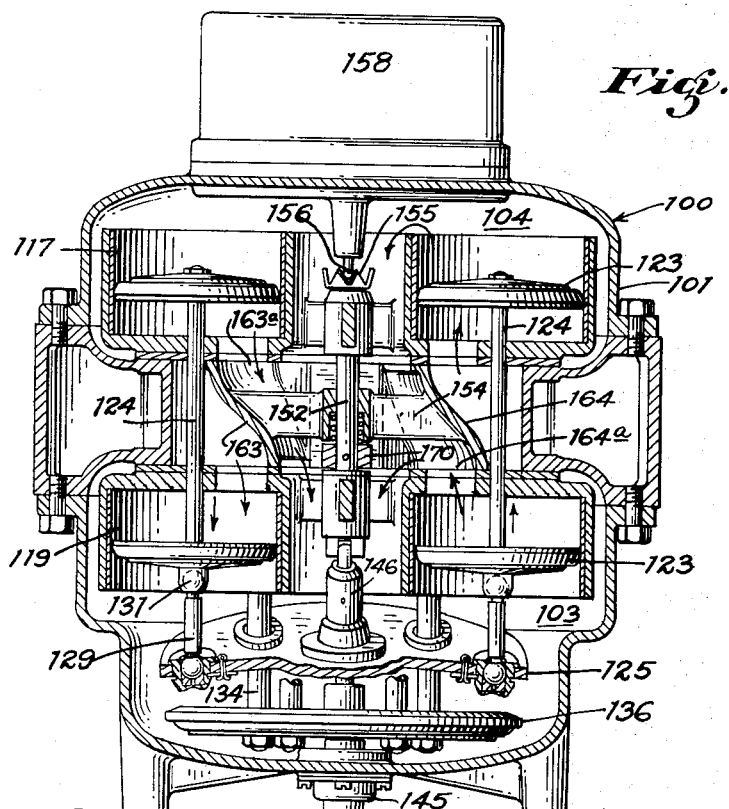
Fig. 10.
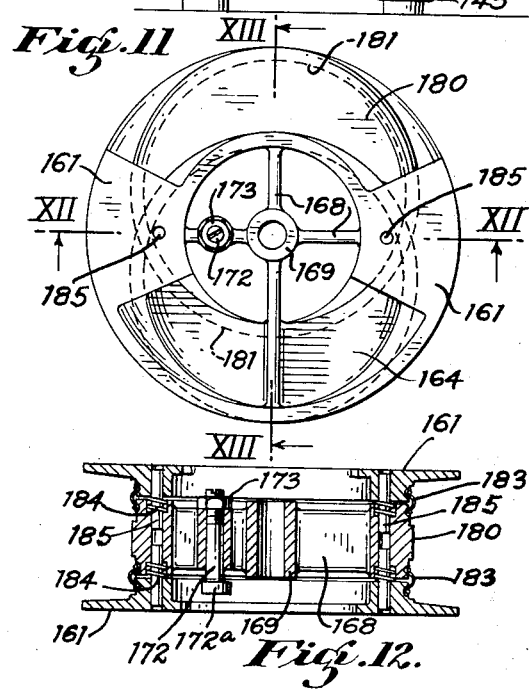
Fig. 11.
Fig. 12.
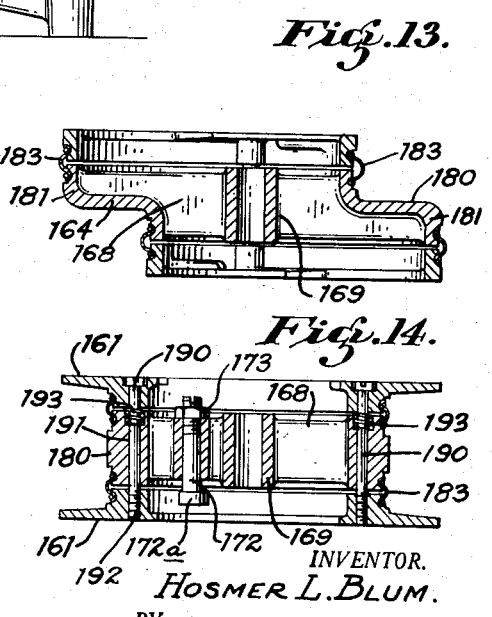
Fig. 13.
Fig. 14.
INVENTOR.
HOSMER L. BLUM.
BY
M S Graham
ATTORNEY Patented Oct. 18, 1938

2,133,270

UNITED STATES PATENT OFFICE 2,133,270

COMPOUND ACTION METER

Hosmer L. Blum, Fort Wayne, Ind.

Application October 12, 1935, Serial No. 44,781

26 Claims. (Cl. 73—244)

This invention relates to fluid meters and more particularly to compound action meters which are operated by the head flow of the fluid in transit through the meter.

Among the objects of the invention are to provide a fluid meter having an increased metering capacity and in which there is a greater degree of hydraulic balance in the flow of fluid through the meter; to provide a meter having increased capacity in which the parts are simplified and in which the internal parts are more readily and easily accessible; to provide in a meter of the aforesaid type an improved valve and seat therefor; to provide adjustability of the meter valve relative to cylinder ports controlled thereby; to provide adjustability of the faces of the valve relative to the seat therefor, and generally to improve upon and simplify the construction of fluid meters and accomplish greater efficiency in operation thereof.

With the foregoing and other objects in view, the invention, broadly stated, consists of the novel features and novel combinations of features of the mechanism herein disclosed, the forms described herein and illustrated in the accompanying drawings being by way of example of preferred forms the invention may take, it being understood that changes in size, material, and proportions of parts and other minor details of the structure are contemplated as being within the spirit of the invention and within the scope of the appended claims.

In the accompanying drawings which are made a part of the specification of the invention:—

Fig. 1 is a vertical transverse section centrally of the meter taken on line I—I of Fig. 2.

Fig. 2 is a plan view of the apparatus of Fig. 1 partly broken away and partly in section to show internal structure.

Fig. 3 is a fragmentary vertical section on line III—III of Fig. 2.

Fig. 4 is a vertical composite section on line IV—IV of Fig. 5, the upper portion comprising the counter mechanism not being shown in detail.

Fig. 5 is a horizontal section taken on line V—V of Fig. 4, the section lines being elevated centrally of the meter to include the valve structure.

Fig. 6 is a vertical fragmentary enlarged detail section of modified form of valve structure and rotating means of the apparatus of Fig. 4.

Fig. 7 is a modified form of the apparatus and shows a vertical section on line VII—VII of Fig. 8.

Fig. 8 is a horizontal section on line VIII—VIII of Fig. 7.

Fig. 9 is a plan view of valve disclosed in Fig. 7, showing detail of structure.

Fig. 10 is a composite vertical section on line X—X of Fig. 8.

Fig. 11 is a plan view of a modified form of valve which may be employed in the device of Fig. 10.

Fig. 12 is a transverse vertical section of a modified form of valve of Fig. 11 taken on line XII—XII of Fig. 11.

Fig. 13 is a transverse vertical section of the modified form of valve of Fig. 11 taken on line XIII—XIII of Fig. 11.

Fig. 14 is a vertical transverse section of a modified form of valve of Fig. 11, and more particularly illustrating a variation in the structure for adjusting the valve faces axially of the valve body.

A more particular description and specification of the invention with reference characters to the various views and parts illustrated in the drawings is as follows:—

Referring to Figs. 1 to 6, inclusive, 20 designates generally a meter in its entirety in which 21 is a casing to which there are terminal conduit openings 22 and 23. For purposes of this description, the inlet opening is designated 22 and the outlet opening designated 23, although it is to be understood that the direction of flow through the meter may be reversed. The interior of the casing is divided into three sections, one end section 24, an opposite end section 25 and a central section 26. The end section 24 may be considered as the bottom section or bowl and contains a plurality of measuring chambers, designated cylinders 27, which are arranged about a common center with their respective longitudinal axes relatively parallel and are spaced from that center thus providing a passageway 28 centrally of the meter, said passageway being in communication with the space in the bottom of the bowl or end section 24 through the opening designated 29 and also being in communication with the central section 26 through the opening designated 30. The cylinders 27, of which there are preferably five in number, are each provided with a liner 31 for purposes of facility in accurately machining the cylinder walls, and also to facilitate replacement. The bottom end 32 of the cylinders may be open, but at their opposite or top end, they are closed except for ports 33 and 34. Each cylinder is provided with a reciprocal piston 35 therein which has a connecting rod 36 depending therefrom which, at its extreme lower end, is provided with a ball 37, the latter being received and held within a cup 38. This cup is recessed in a wobble or nutating plate 39. Each of the pistons in the respective cylinders is connected similarly to the wobble plate and the foregoing description of one is believed to be sufficient. The wobble plate may be of any suitable type of construction, and as herein exemplified is a disc having openings 40 adjacent its periphery to receive the pockets or cups 38. The wobble plate is also provided with a plurality of openings 41 for receiving bushing members 42 which ride upon rods 43 and thus guide and stabilize the wobbling movement of the nutating or wobble plate 39. The rods 43 have threaded connection with the cylinder block as indicated 44, and at their opposite end support a track 45 which limits the downward movement of the periphery of the wobble plate. Pin 46 is mounted threadedly axially of the track member 45 and extends thereabove, having at its upper end a ball 47 upon which the wobble plate is seated and maintained thereon by clamp member 48 forming a universal joint. The wobble plate is adjustable with relation to the track 45 by means of the pin 46 and the threaded mounting thereof in the track member 45, the pin 46 being rotatable for advancement or retraction by a key 48ª which is engaged by a nut 49 of a bolt 50 which serves in the nature of a socket wrench for turning the key 48. The bolt 48 extends beyond the bottom of the casing 21 and is locked in position by a lock nut 51, the end of the bolt and the lock nut having a cap 52 thereover to prevent tampering therewith. Extending upwardly from the wobble plate at its axial center is a lever arm 53 with a socket 54 therein for receiving a pin 55, the free end of which is engaged in a yoke 56 of an arm 57 which is fixedly secured to a shaft 58. The shaft 58 is rotatable in a tubular member 59; the latter being formed as a hub which is supported by ribs 60 which are formed as a part, preferably integral, of the cylinder block, the ribs 60 extending radially inwardly from the cylinder block and being positioned within the passageway 28, without interrupting flow therethrough, due to the space between the ribs.

In the central section 26 there is provided a pair of spaced parallel valve seat plates 61, 62. These plates 61, 62 comprise the two side walls of the central chamber and are fixedly secured in place as by countersunk screws 63 which are threaded into suitable portions of the respective end sections. A circumferential wall 64 surrounds the periphery of the face plates 61, 62, thus forming central section 26 and providing in said section a chamber which serves the dual capacity of a valve chamber for a rotary valve body 73 and a conduit for inflowing fluid. The valve seat plate 62 most nearly adjacent the cylinders 27 is provided with the central opening 30 and a plurality of circumferentially arranged openings 65, one of the latter for each cylinder port 33 through which there is communication directly to the interior of each cylinder 27, the opening 65 being generally elongated as indicated in Figs. 2 and 5. The opposite valve face plate 61 also is provided with a central opening 66 which communicates with the open space in the upper end section 25 which is opposite the bowl section, said end plate 61 being also provided with a plurality of circumferentially arranged and substantially elongated openings 67, the edges of which are preferably aligned with the edges of the openings 65 so that the corresponding openings in plates 61 and 62 are opposite to each other. In the upper end section 25 there is provided a plurality of conduits 68, said conduits being in communication with the central section, or the valve and conduit chamber, through the openings 67, and also being in communication with the interior of the cylinders 27 through the openings 69 and cylinder ports 34. There is one of these conduits 68 for each cylinder.

The remainder of the upper end section 25 comprises a pair of conduits separated by a partition wall 70, one of said conduits 71 being in communication with the terminal openings, designated as the inlet 22, and the other of said conduits 72 being in communication with the other terminal opening, designated as the outlet 23, and also in communication with the central passageway 28 and the bowl or lower portion 24 of the meter body. The conduit 71 also communicates with the conduit portion of the central section 26, and it will therefore be apparent that fluid flowing into the opening 22 and through the conduit 71 may flow around the conduit members 68 and enter the conduit portion of the chamber 26 and flow directly into cylinders 27 through openings 65, 67. For purposes of identification the portion of the central section which comprises the conduit is designated 22ª and the portion which comprises the valve chamber is designated 26ᵇ.

Within the valve chamber portion 26ᵇ of the central section 26 is a valve member 73 positioned for operation between the spaced parallel valve seat plates 61, 62. The valve member 73 has parallel opposite faces 74, 75 in slidable contact with the opposed faces of the respective valve seat plates 61, 62. The faces 74, 75 of the valve 73 are of suitable width to properly close the openings 65, 67 of the plates 61, 62, said faces being substantially circular in plan, and may be provided with depressions 76 which serve both the purpose of reducing friction and providing a plurality of sealing cells in contact with the faces of plates 61, 62. The separate valve plates providing faces 74, 75, may be cored out to reduce the weight thereof. Such coring may be accomplished in any suitable manner, examples of which are illustrated in the vertical sections through the valve plates in Figures 3 and 6, but such coring does not affect the form or function of the valve faces 74, 75. The valve body 73 is open centrally as at 77 so that as the valve is operated said central opening may communicate at all times with the conduit 72, and with the bowl of the meter body through the central passageway 28. When the valve body is rotated orbitally as hereafter described, the opening 77 communicates simultaneously with the ports or openings 65 and 67, and thus communicates simultaneously with both ports 33, 34 of the cylinders. The radially inner wall of the valve is connected to legs 78 of a spider member having a hub 79 which is rotatably mounted upon a pin 80 so that there is relative rotation between valve 73 and pin 80. Pin 80 has its lower end rotatably engaged by a lever or crank arm 81, the latter being fixedly connected at its opposite end to the rotatable shaft 58 by means of the threaded screw 82. By loosening the screw 82 the crank arm 81 may be adjusted forwardly or rearwardly and thus adjust the position of the valve relative to the openings which it controls for timing the valve with respect to the motion of the pistons. The valve in the present exemplification is constructed of two annular rings axially aligned, and the rings may be relatively adjusted axially by the set screw 84 which is threadedly mounted in one of the rings and is provided with a pilot point adapted to engage a bore in the other of said rings; and said screw is maintained in its adjusted position by its accompanying nut 85 so that the faces of the valve may at all times be maintained with a proper snug sliding fit in relation to the faces of the respective valve seat plates. A flexible annular member 86 surrounds the circumferential wall of the valve, as best shown in Fig. 6, and it is positioned by ring members 87, thus eliminating any leakage between the central opening 77 through the valve body and the inlet conduit portion 22ª of the central section 26. While the exemplification of the valve shown in Figs. 1 to 6, inclusive, illustrates axially aligned plates 73ª and 73ᵇ which are orbitally rotated by the spider 79 and crank arm 81, it is to be understood that a valve similar to those shown in Figs. 11 to 14, may be mounted concentrically directly upon the shaft 58 for rotation thereby and would serve the same purpose, except that such a valve would have to be larger in diameter than the orbitally moving valve. Of course, the valve ports would also take the form of those shown in Fig. 8, with this type of valve. The smaller orbitally rotated valve as herein illustrated is preferred because of the lighter weight and opportunity for adjustment by the lever 81.

A cover or top plate 86ª is provided to close the upper section 25, said top plate mounting thereon a counter device generally indicated 87ª which through suitable gearing 88 and shaft 89 serves to register the amount of the fluid flowing through the meter. The counter mechanism is operated through a crank 90 which has a fork 91 engaging the upper end of the pin 80. A shaft 89 is rotated by the orbital movement of said pin responsive to the reciprocation of the piston in the cylinders which acts through the wobble plate to rotate shaft 58. An independent pipe 92 extends from the bottom portion of the bowl upwardly through the casing and has its opening into the conduit designated as the outlet 23, the purpose of this pipe being that any water which may settle in the bottom of the bowl may be drawn upwardly and discharged with the fluid flowing out of the meter.

The respective parts of the meter casing may be joined together by any suitable connecting means such as bolts 93 and 94, it being preferred that the top 86ª be made a removable element, and also that the portions of the casing enclosing the respective end sections should likewise be disconnectible and removable in order to facilitate repairs, replacements, or adjustments within the meter body.

It is believed that the operation of the meter as it is disclosed in Figs. 1 to 6, inclusive, is self-explanatory to one skilled in the art. Assuming that conduit member 22 is employed as an inlet conduit, the fluid flows through the conduit 22 into conduit 71 and around the conduits 68ª whereupon it enters the conduit 22ª of the central section. The conduit 22ª extends circumferentially around the valve body whereby the liquid may flow therearound and enter cylinders, the ports of which are not blocked by the valve body. Thus, in Fig. 1 the fluid would flow through the ports 65 and 67 and fill the cylinder through the respective cylinder ports 33 and 34 and thereby depress the piston 35, which in turn wobbles the nutating or wobble plate 39, resulting in rotation of shaft 58 which rotates the valve body 73. Since the valve body is orbitally rotated, it serially opens the ports of certain cylinders while closing ports of substantially diametrically opposite cylinders, and as the valve is further rotated the ports 65 and 67 communicate with the central opening 77 of the valve so that upon the return stroke of the piston the discharge from the cylinder is through the central opening 77 of the valve body and into the chamber 72 and through the central chamber 28 into the bowl of the casing, the opening 72 and the bowl being in communication with the outlet opening 23.

Referring to the modified form of the meter illustrated in Figs. 7 to 10, inclusive, like the meter heretofore described, a meter body generally indicated 100 is provided with a casing 101, the latter being divided into a central section 102, and respective opposite end sections 103 and 104. The central section is provided with a pair of operatively opposite terminal openings for inlet and discharge, it being understood that the meter may be operated in either direction. For purposes of this description, the inlet opening is indicated as 105 and the outlet opening as 106. The inlet opening 105 communicates with a conduit 107 in the central section, the conduit 107 being separated from the outlet conduit 106 by a partition wall 108. The central section 102 also provides a valve chamber for a valve body which is more particularly described hereafter. Relatively spaced parallel valve seat plates 109, 110 comprise the side walls for the central section and the partition wall 108 provides a surrounding and partially circumferential wall to enclose the conduit of the central section and the valve chamber. The respective valve seat plates each has a central opening, respectively, 111, 112, and each has a plurality of circumferentially arranged ports, 113 in the upper plate and 114 in the lower plate, each of which ports opens into a cylinder chamber to be hereafter described. Each of such plates also has circumferentially arranged openings 115 to slidably receive a connecting rod 124 between pistons.

The upper end section 104 has a plurality of circumferentially arranged measuring chambers designated as cylinders 116 which are provided with liners 117 for purposes of perfection in machining and for replacement due to wear. The cylinders have their longitudinal axes relatively parallel and are spaced from a common center and provide therebetween a passageway 118 centrally of the bank of cylinders, said central passageway communicating with the outlet opening 106. The lower end section 103 includes a bank of circumferentially arranged cylinders, 119, also having liners 117, the cylinders in the end section 103 being axially aligned with the cylinders in the opposite end section, each cylinder being open at an extreme end 120 and closed at the other end by a wall 121 having a port 122, said ports registering with and communicating with the respective openings 113 and 114 in the respective valve seat plates. Each cylinder is provided with a piston 123 which is reciprocal therein, the pistons in axially aligned and oppositely disposed cylinders being connected by the connecting rod 124 so that pistons in axially aligned opposite cylinders reciprocate simultaneously in unison, and in opposite directions relative to the ports 122; that is, when the piston is discharging the fluid from one cylinder the piston in the opposite cylinder is being simultaneously moved so that fluid may flow into the latter cylinder.

The lower portion of end section 103 constitutes a bowl within which is mounted a wobble plate or nutating disc plate generally indicated 125 having holes 126 adjacent its periphery to receive cups 127 which provide sockets for ball joints 128, the latter being connected by a rod 129 to another ball 130 which in turn forms a ball joint in a socket 131 which is connected to one end of the connecting rod 124, the latter, in turn, connecting the pistons in opposite cylinders. The wobble plate also has an additional series of circumferential holes 132 spaced from the periphery thereof which receive ringlets or bushings 133, whereby the wobble plate is guided vertically in its wobbling movement by rods 134 which are threadedly mounted at one end in webs 135 between the cylinders in the end section 103. At the other end of the rods 134 there is mounted a wobble plate track member 136 which limits the movement of the wobble plate. At its center the track member 136 mounts an upstanding pin 137, at the upper end of which is a ball 138 upon which the wobble plate is mounted for universal movement by means of a clamp plate 139. The wobble plate may be adjusted by the threaded engagement of pin 137 in the track member as at 140, by turning the pin by means of a key 141 which is engaged by a socket 142 in the head of a screw member 143, the screw member 143 extending through the bottom of the casing and having a lock nut member 144. A suitable cap 145 may cover the exposed end of the screw 143 to avoid tampering therewith. Extending upwardly from the axial center of the wobble plate is a lever 146 provided with a longitudinal central socket 147 which rotatably receives a drive pin 148 which is spring pressed outwardly of the socket by spring 147ª, and which is provided with a groove 148ª intermediate its ends for permitting circulation of the fluid contained in the bowl to be established through the socket by means of the perforations 147ᵇ in the walls of said socket. This circulation serves to lubricate the pin. The drive pin is engaged at its free end in the fork 149 of a crank arm 150 which is fixedly connected as by lock pin 151 to shaft 152, the latter being rotatably supported axially of the meter body in bearings 153 which are formed centrally of webs 154, the latter being disposed in the central openings formed by the circumferential cylinders in each end section. At the upper end of the shaft 152 there is mounted a means for operating a counter device and as herein illustrated comprises a star member 155 which engages between its points a crank arm 156 and thereby rotates same. The crank arm is connected to suitable gear mechanism generally indicated 157 which in turn operates a counter device generally indicated 158.

Within the valve chamber of the central section 102 and operative between spaced parallel opposing faces of the valve seat plates 109, 110 is a valve body 160 which is mounted upon and rotates with shaft 152. The valve body of Fig. 7 is circular in plan as best shown in Fig. 9 and comprises a hollow shell having similar valve plate faces at each of its respective axial ends. Each face is open at its axial center as at 167 and is provided with segmental wing portions 161 which extend from the periphery of the valve face radially inwardly with side edges converging toward the center opening. These segmental wing portions 161 are diametrally opposite each other in the horizontal planes of the same plate and overlie similar wing segments in the opposite plate. Vertical walls 162 extend from the inward edge and the converging edges of the segmental wing portions in one plate to the similar edges of the segmental wing portions in the plate at the other end of the valve body, forming boxes which are open at their outer face and hollowed out to eliminate weight. There are also arcuate inclined walls 163 and 164 in the shell of the valve body, one of which, 163 (in the view of Fig. 9), inclines downwardly and inwardly from the peripheral edge of one face plate to the other face plate of the valve body, and the other wall, 164, inclines upwardly and inwardly from the peripheral edge of the opposite face of the valve body. The thickness of the material of these walls forms the arcuate strips 165 and 166 at the opposite ends of the valve body. Thus, the valve faces each have an arcuate opening 163ª and 164ª extending between the opposite wings of that plate, said opening communicating with the central opening 167 extending axially through the valve body, and the latter communicating with the central openings 118 and 118ª of the respective upper and lower sections of the meter body. From Fig. 9 it will be noted that the inclined walls 163, 164 are relatively diametrally oppositely disposed so that the arcuate openings 163ª and 164ª in the valve faces are likewise on opposite sides of the valve body and are relatively oppositely offset with relation to the axis of the valve body, as best shown in the cross-section of the valve body of Fig. 10. The central opening of the valve body has radial webs 168 transversely thereof which support a hub bearing 169 by which the valve body is mounted on rotatable shaft 152. The valve body may be fixedly mounted upon shaft 152 to rotate therewith or may be snugly and slidably mounted upon said shaft so as to be readily removable therefrom. As herein illustrated the valve is snugly and slidably mounted on shaft 152 by the central bearing 169, and is rotated by a collar 170 pinned to shaft 152, said collar having a forked crank extension 171 in the fork of which is engaged the eccentric head 172ª of a bolt member 172. The bolt 172 is threadedly engaged in one of the webs 168, the bolt member having a key slot at its opposite end and a lock nut 173. Thus, by loosening the lock nut 173 and turning the bolt 172 the eccentric head 172ª will advance or retard the timing of the rotation of the valve relative to the valve chamber ports. In order to avoid the friction of the weight of the valve from bearing exclusively on the lower valve face plate 110, the valve may have its weight partially borne by a spring 174 recessed in the hub bearing 169, thereby also maintaining a snug slidable contact between the upper face of the valve body and the upper valve face plate 109.

In Figs. 11 to 13, inclusive, a modified form of the valve of Fig. 7 is shown in which the face plates 161 are similar to the face plates of the valve of Fig. 9, but instead of having integral inclined walls, the valve body has a vertical intermediate or central member 180 which is centrally hollow, with axially spaced vertically offset annular rims 181 connected by an imperforate wall, the ribs 168 and hub 169 being substantially similar to like elements of the valve body of Figs. 7 and 10. The opposite rims 181 of the intermediate member 180 are indicated by dotted lines in Fig. 11, from which it will be noted that the radius of rims 181 is less than the maximum radius of the valve plate and, therefore, the rims do not conform to the arcuate perimetral curves of the valve plate. The central section does, however, provide a central opening therethrough to communicate with central openings 118, 118ª of the meter body and provides a passageway from the arcuate opening of one valve plate to the arcuate opening of the opposite valve plate, communication between the said passageway and the exterior of the valve into the conduit of the central section 102 of the meter body being cut off by the wall 164 which, in Figs. 11 to 13, is of ogee formation in vertical cross-section on one diameter of the valve body and is vertical in cross-section transversely of the valve body. The separate valve plates 161 are seated on, and at portions extend radially beyond, the rims 181 of the central member 180 and are guided relative to the rims by the plug rods 185. Sealing bands 183 close any possibility of leakage from the joint formed between the central member 180 and the valve plates mounted thereon. This form of valve provides for the changing of valve plates in case of wear, and for pressing the valve plates into proper contact with the valve seat plates, 109, 110, the means comprising compressed springs 184 mounted on short plug rods 185 in complementary bores and recesses cut in the central member, the springs serving to resiliently press the respective valve plates into snug contact with the valve seat plates, 109, 110.

The valve shown in cross-section in Fig. 14 is a slight modification of the valve shown in Figs. 11 to 13, inclusive. The modification consists in providing means to fixedly adjust the valve plates vertically axially of the valve body. The means comprises headed bolts 190 which are received in bores 191 which extend continuously through one of the valve plates, and through the vertical walls of the central member 180. Each bolt has a threaded end which is received in a complementary threaded socket in the opposite valve plate as at 192. Upon the turning of the bolts the valve plates are adjusted relative to each other by means of the spring member 193 which provides sufficient tension to the valve plates so that they are relatively moved to the limit allowed by the bolts 190. Otherwise, the valve of Fig. 14 is similar in structure to the valve of Figs. 11 to 13, inclusive.

It is believed that a very brief description of the operation of the meter of Figs. 7 and 10 is sufficient, taken in connection with the foregoing description of the structure. The operation is best explained by reference to Figs. 7 and 10 collectively. Assuming that the flow of the fluid is into the inlet opening 105, the fluid flows into the central section of the meter body 102 and more particularly into the conduit 107 circumferentially of the valve body 160. When the valve is in proper position as indicated in Fig. 10, the fluid flows from conduit 107 through openings 113 of the plate 110 and through ports 122 in the cylinders. The form of the valve is such that cylinders lying on opposite sides of the valve chamber and located at substantially diametrically opposite sides of the meter body are receiving an inflow of fluid substantially simultaneously as indicated in Fig. 10. The valve is so formed and synchronized with the pistons in its timing that simultaneously with the filling of a cylinder in one end section of the meter the central passageway 167 of the valve body communicates with the port of the axially opposite cylinder, so that the piston in the receiving cylinder, while being forced in one direction carries with it the piston in the axially opposite cylinder and thus discharges the fluid from the latter through central opening 167 and through the passageways 118, 118ª, to the outlet 106. Simultaneously, the ports of intermediate axially opposite cylinders are momentarily and successively sealed by the wing plates of the valve until the valve may move into proper position to either open the cylinder ports for filling thereof or cover the cylinder ports upon the discharge therefrom. It will be noted that in this operation the fluid is received into the cylinders directly from the conduit 107 of the central section and is discharged from the cylinders through the central opening or passageway of the valve into the passageways 118 and 118ª centrally of the meter body and thence through conduits 106ª and 106ᵇ leading from the upper section 104 and the lower section 103 to the discharge conduit 106. The reciprocation of the pistons in the cylinders due to the above described flow of fluid causes the nutating plate 125 to wobble and thereby orbitally move the upstanding lever 146 and pin 148, the latter of which in turn engages the crank 150 and thereby rotates the shaft 152 upon which the valve body is rotated by the collar and crank 170. Thus, the reciprocation of the successive pistons is correlated by the wobble plate and, through the mechanism described, rotates the valve member and simultaneously operates the counter mechanism which is connected to the upper end of the rotatable shaft 152.

As heretofore set forth the rotative movement of the valve in Figs. 1 to 6, inclusive, is orbital relative to the axis of the shaft 58, whereas, in Figs. 7 to 14, inclusive, the valve body is mounted for rotation on an axis of rotation of its own, though the valve faces in some modifications may be eccentric to such axis of rotation. In the claims the valve is described as rotatable, using that term generically to include the movement of all of the described types of valves.

I claim:

1. A fluid meter having a pair of terminal openings for flow of fluid respectively into and out of the meter, a valve chamber having independent communication with each of said terminal openings and being provided at opposite sides of its interior with relatively spaced valve seat faces, each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a plurality of ported cylinders arranged radially about a common center, said cylinders having their respective longitudinal axes parallel and each having valve-controlled communication with the valve chamber, a piston reciprocal in each cylinder and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

2. A fluid meter having a pair of terminal openings for flow of fluid respectively into and out of the meter, a valve chamber having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a plurality of ported cylinders arranged radially about a common center, said cylinders having their respective longitudinal axes parallel and each having valve-controlled communication with the valve chamber, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinder which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

3. A fluid meter having a pair of terminal openings for flow of fluid respectively into and out of the meter, a valve chamber having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a plurality of ported cylinders arranged radially about a common center, said cylinders having their respective longitudinal axes parallel and each having valve-controlled communication with the valve chamber, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

4. A fluid meter having a pair of terminal openings for flow of fluid respectively into and out of the meter, a valve chamber having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a plurality of ported cylinders arranged radially about a common center, said cylinders having their respective longitudinal axes parallel and each having valve-controlled communication with the valve chamber, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

5. A fluid meter having a pair of terminal openings for flow of fluid respectively into and out of the meter, a valve chamber having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a plurality of ported cylinders arranged radially about a common center, said cylinders having their respective longitudinal axes parallel and each having valve-controlled communication with the valve chamber, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, said valve including means for relatively axially adjusting the plate members of the valve, and said valve having means engageable by the rotating means whereby the timing of the valve may be selectively advanced and retarded relative to the valve chamber ports.

6. A fluid meter comprising a casing including a bowl for receiving and holding a supply of fluid in transit through the meter, said casing having a pair of terminal openings for flow of fluid respectively into and out of the meter, a valve chamber in the casing having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such diameter as to provide exteriorly of the valve a fluid conduit communicating directly with one of said terminal openings, a plurality of ported cylinders in said casing arranged radially about a common center and radially spaced therefrom providing an open passageway centrally of the cylinders and communicating with the other of said terminal openings, said cylinders having their respective longitudinal axes parallel and each having valve-controlled communication with the valve chamber, a piston reciprocal in each cylinder, and means in said casing operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

7. A fluid meter comprising a casing including a bowl for receiving and holding a supply of fluid in transit through the meter, said casing having a pair of terminal openings for flow of fluid respectively into and out of the meter, a valve chamber in the casing having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a plurality of ported cylinders in said casing arranged radially about a common center and radially spaced therefrom providing an open passageway centrally of the cylinders and communicating with the other of said terminal openings, said cylinders having their respective longitudinal axes parallel and each having valve-controlled communication with the valve chamber, a piston reciprocal in each cylinder, and means in said casing operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

8. A fluid meter comprising a casing including a bowl for receiving and holding a supply of fluid in transit through the meter, said casing having a pair of terminal openings for flow of fluid respectively into and out of the meter, a valve chamber in the casing having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a plurality of ported cylinders in said casing arranged radially about a common center and radially spaced therefrom providing an open passageway centrally of the cylinders and communicating with the other of said terminal openings, said cylinders having their respective longitudinal axes parallel and each having valve-controlled communication with the valve chamber, a piston reciprocal in each cylinder, and means in said casing operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communicate successively with the fluid conduit exteriorly of the valve and with the central conduit of the valve, and said valve having means engageable by the rotating means whereby the timing of the valve may be selectively advanced and retarded relative to the valve chamber ports.

9. A fluid meter comprising a casing including a bowl for receiving and holding a supply of fluid in transit through the meter, said casing having a pair of terminal openings for flow of fluid respectively into and out of the meter, a valve chamber in the casing having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a dimeter as to provide exteriorly of the valve a fluid conduit communicating directly with one of said terminal openings, a plurality of ported cylinders in said casing arranged radially about a common center and radially spaced therefrom providing an open passageway centrally of the cylinders and communicating with the other of said terminal openings, said cylinders having their respective longitudinal axes parallel and each having valve-controlled communication with the valve chamber, a piston reciprocal in each cylinder, and means in said casing operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

10. A fluid meter comprising a casing including a bowl for receiving and holding a supply of fluid in transit through the meter, said casing having a pair of terminal openings for flow of fluid respectively into and out of the meter, a valve chamber in the casing having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a plurality of ported cylinders in said casing arranged radially about a common center and radially spaced therefrom providing an open passageway centrally of the cylinders and communicating with the other of said terminal openings, said cylinders having their respective longitudinal axes parallel and each having valve-controlled communication with the valve chamber, a piston reciprocal in each cylinder, and means in said casing operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, said valve including means for relatively axially adjusting the plate members of the valve, and said valve having means engageable by the rotating means whereby the timing of the valve may be selectively advanced and retarded relative to the valve chamber ports.

11. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

12. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

13. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

14. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

15. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces, each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, said valve including means for relatively axially adjusting the plate members of the valve, and said valve having means engageable by the rotating means whereby the timing of the valve may be selectively advanced and retarded relative to the valve chamber ports.

16. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a relatively off-set valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

17. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a relatively off-set valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

18. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a relatively off-set valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

19. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible seating band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a relatively off-set valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

20. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a relatively off-set valve face at each of its opposite ends and a central conduit which communicates with the other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, said valve including means for relatively axially adjusting the plate members of the valve, and said valve having means engageable by the rotating means whereby the timing of the valve may be selectively advanced and retarded relative to the valve chamber ports.

21. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center and radially spaced therefrom providing an open passageway centrally of the cylinders and communicating with the other of said terminal openings, said cylinders of each bank having their respective longitudinal axes parallel and each having valve-controlled communication with the valve chamber, and the cylinders of one bank being axially aligned with cylinders in the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

22. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center and radially spaced therefrom providing an open passageway centrally of the cylinders and communicating with the other of said terminal openings, said cylinders of each bank having their respective longitudinal axes parallel and each having valve-controlled communication with the valve chamber, and the cylinders of one bank being axially aligned with cylinders of the other bank, a piston reciprocal in each cylinder, the pistons in opposed cylinders having a connecting rod therebetween for reciprocation of opposite pistons in unison, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve.

23. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center and radially spaced therefrom providing an open passageway centrally of the cylinders and communicating with the other of said terminal openings, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

24. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center and radially spaced therefrom providing an open passageway centrally of the cylinders and communicating with the other of said terminal openings, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, and said valve having means engageable by the rotating means whereby the timing of the valve may be selectively advanced and retarded relative to the valve chamber ports.

25. A fluid meter having a pair of terminal openings for flow of fluid respectively into and out of the meter, a valve chamber interposed between the relatively spaced banks of cylinders and having independent communication with each of said terminal openings and being provided at opposite sides of its interior with relatively spaced valve seat faces each having ports for communicating with measuring cylinders, a rotatable valve in said valve chamber for controlling the said ports thereof, said valve comprising a plurality of overlying relatively adjustable plate members and a flexible sealing band circumferentially of the abutting edges thereof, the said valve chamber being of such a diameter as to provide exteriorly of the valve a fluid conduit communicating directly with one of said terminal openings, a pair of relatively axially spaced opposed banks of ported cylinders, the cylinders of each bank being arranged about a common center, and radially spaced therefrom providing an open passageway centrally of the cylinders and communicating with the other of said terminal openings, said cylinders of each bank having their respective longitudinal axes parallel and each having valve-controlled communication with the valve chamber, and the cylinders of one bank being axially aligned with cylinders in the other bank, a piston reciprocal in each cylinder, and means operatively responsive to reciprocation of successive pistons for correlating the reciprocation of the pistons and translating the reciprocation thereof to rotary motion for rotating the valve, said valve comprising a side wall, a valve face at each of its opposite ends and a central conduit which communicates with said other of said terminal openings, said valve faces each having an opening therethrough to said central conduit, said valve face openings being eccentric to the common center about which the cylinders are arranged, the said valve being free of conduit communication between cylinders which are respectively discharging and receiving fluid simultaneously and cooperating with the valve seat faces to prevent such communication, and being adapted for opening each of said ports of the valve chamber to communication successively with the fluid conduit exteriorly of the valve and with the central conduit of the valve, said valve including means for relatively axially adjusting the plate members of the valve, and said valve having means engageable by the rotating means whereby the timing of the valve may be selectively advanced and retarded relative to the valve chamber ports.

26. A fluid displacement meter having a body provided with a pair of terminal openings for the respective inflow and outflow of fluid and having measuring cylinders with their longitudinal axes parallel, pistons reciprocably mounted in such cylinders, piston correlating means operatively responsive to reciprocation of the pistons in the cylinders for correlating the reciprocation of the pistons and translating the reciprocation thereof to rotary motion for rotating a valve, a valve chamber, and a valve rotatably mounted in said chamber on an axis of rotation parallel to the longitudinal axes of the cylinders, the said valve having a central conduit therein and comprising a side wall which provides at each of its opposite ends a valve face eccentric to the axis about which the valve rotates, said valve faces being offset relative to each other; the said valve chamber having, exteriorly of the valve side wall, communication with one of said terminal openings and having a central opening in communication with the other of the terminal openings and being provided with relatively spaced parallel valve seat faces each having ports for communicating with the measuring cylinders, the said valve being free of conduit communication between discharging cylinders and receiving cylinders and cooperating with the valve seat faces to prevent such communication, and said valve being adapted for controlling the ports of the valve chamber and for providing communication by way of the valve chamber for flow of fluid between one of said terminal openings and a portion of the cylinders, and simultaneously to provide communication for flow of fluid between another portion of the cylinders and the other of the said terminal openings through the central conduit of the valve, and the said piston correlating means cooperating with said valve for opening each cylinder to communication with one of the respective terminal openings upon each stroke of a piston in the cylinder.

HOSMER L. BLUM.